(12) United States Patent
Takanashi

(10) Patent No.: US 7,197,835 B2
(45) Date of Patent: Apr. 3, 2007

(54) DETECTOR SUPPORTING MECHANISM

(75) Inventor: Ryo Takanashi, Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 11/110,953

(22) Filed: Apr. 21, 2005

(65) Prior Publication Data

US 2006/0101660 A1 May 18, 2006

(30) Foreign Application Priority Data

Nov. 18, 2004 (JP) ............................. 2004-334691

(51) Int. Cl.
*G01B 50/004* (2006.01)
*G01B 5/008* (2006.01)
(52) U.S. Cl. .............................. 33/503; 33/556; 33/559
(58) Field of Classification Search ................. 33/503, 33/556, 558, 559, 561, 549, 555.1, 558.01, 33/558.4
See application file for complete search history.

(56) References Cited

U.S. PATENT DOCUMENTS

| 3,217,418 | A | * | 11/1965 | Wennerberg | ................. | 33/543 |
| 3,478,436 | A | * | 11/1969 | Barnes | ......................... | 33/503 |
| 3,531,868 | A | * | 10/1970 | Stevenson | .................... | 33/503 |
| 3,678,584 | A |   | 7/1972  | Dolan |  |  |
| 4,807,152 | A | * | 2/1989  | Lane et al. | ................. | 700/247 |
| 5,410,817 | A | * | 5/1995  | Kish | ............................ | 33/559 |
| 5,430,547 | A | * | 7/1995  | Takagi et al. | ............... | 356/614 |
| 5,829,148 | A | * | 11/1998 | Eaton | ........................... | 33/503 |
| 5,926,781 | A | * | 7/1999  | Scott | ........................... | 702/151 |
| 6,546,643 | B2 | * | 4/2003 | Lotze et al. | ................... | 33/559 |
| 6,668,466 | B1 | * | 12/2003 | Bieg et al. | ..................... | 33/503 |
| 6,931,745 | B2 | * | 8/2005  | Granger | ....................... | 33/503 |

FOREIGN PATENT DOCUMENTS

| JP | 06-300505 | 10/1994 |
| JP | 07-091949 | 4/1995 |
| JP | 11-063971 | 3/1999 |
| WO | WO 98/12497 A1 | 3/1998 |

OTHER PUBLICATIONS

Patent Abstracts of Japan, vol. 1995, No. 01, Feb. 28, 1995, & JP 06 300505 A (Kosaka Kenkyusho KK), Oct. 28, 1994, English Abstract.

* cited by examiner

*Primary Examiner*—Diego Gutierrez
*Assistant Examiner*—Amy R. Cohen
(74) *Attorney, Agent, or Firm*—David S. Safran

(57) ABSTRACT

A detector supporting mechanism comprising a first arm having its one end fixed on a mount linearly movable relative to a workpiece, the first arm having a rotation axis at the other end and a second arm provided on the first arm so as to be turnable on the rotation axis relative to the first arm, a detector being mounted on a tip of the second arm, wherein the rotation axis is provided on a plane inclined at an angle of 45° from the movement axis of the mount while being inclined at an angle of 45° from the movement axis of the mount in a projection on a plane which is inclined at an angle of 45° from the plane inclined at an angle of 45° from the movement axis of the mount, and which contains the movement axis of the mount, and wherein an axis of the detector mounted on the second arm intersects the rotation axis.

7 Claims, 16 Drawing Sheets

DETECTOR SUPPORTING MECHANISM

BACKGROUND OF THE INVENTION

1. Field of the Invention

The present invention relates to a detector supporting mechanism and, more particularly, to a detector supporting mechanism for supporting a detector which is used, for example, in a circularity measuring apparatus to detect a small displacement of a workpiece.

2. Related Art

A workpiece having a cylindrical shape is rotated about its axis and the circularity, the cylindricity or the like of the workpiece is measured. For example, a workpiece W shown as a workpiece with a flange in FIG. 12 is rotated about a rotational centerline WC, and the circularity of an outer peripheral portion of the cylinder is measured by bringing a probe P of a lever-type detector 31 or the like into contact with the outer peripheral portion of the cylinder and by detecting a runout of the outer peripheral portion. Alternatively, the circularity of a bore is measured by bringing the probe P of the detector 31 into contact with an inner peripheral portion of the bore, or a runout of the flange is detected by bringing the probe P into contact with the upper surface of the flange.

In this case, there is a need to perform detection and measurement in such a manner that, for example, a runout of the outer peripheral portion of the cylinder is detected in a state where the detector 31 is supported in a vertical attitude and where the detection direction is horizontally set, and a runout of the flange is thereafter detected by changing the attitude of the detector 31 to a horizontal position and by adjusting the detection direction to a vertical direction.

Various detector supporting mechanisms designed to facilitate change of the detection direction of the detector 31 have been proposed and circularity measuring apparatuses having such detector supporting mechanisms have also been proposed (see, for example, Japanese Patent Application Laid Open Nos. 11-063971, 07-091949, and 06-300505).

A detector supporting mechanism disclosed in Japanese Patent Application Laid Open No. 11-063971 is as shown in FIGS. 13 and 14. That is, one end of an L-shaped supporting arm 111 is rotatably mounted on a mount by means of a horizontal/vertical fine adjustment mechanism 22, and a detector 31 is fixed to the other end of the supporting arm 111. The supporting arm 111 is turned through an angle of 90° from a state in which the detector 31 is vertically supported (FIG. 13) to change the attitude of the detector 31 to a horizontal direction shown in FIG. 14.

In this case, the detection direction is still horizontal even after the supporting arm 111 has been turned through an angle of 90° to change the attitude of the detector 31 to the horizontal direction. To change the detection direction to the vertical direction, the detector 31 is rotated through an angle of 90° about its axis.

A detector supporting mechanism disclosed in Japanese Patent Application Laid Open No. 07-091949 is constructed so that, as shown in FIG. 15, a second arm 212 on which a detector 31 is supported is turned relative to a first arm 211 fixed on a mount 21 through an angle of 180° about a rotation axis RC inclined at an angle of 45° in one direction from the vertical direction.

In this case, the detection direction of the probe P when the detector 31 is in the vertical attitude corresponds to the direction of arrow H shown in the figure (the direction perpendicular to the plane of projection of the figure). The detection direction is still the same as the direction of arrow H in the figure even after the second arm 212 has been turned through an angle of 180° to change the attitude of the detector 31 to the horizontal as indicated by the double-dot dash line in the figure. To change the detection direction to the vertical direction (the direction of arrow V in the figure), the detector 31 is rotated through an angle of 90° about its axis KC.

A detector supporting mechanism disclosed in Japanese Patent Application Laid Open No. 06-300505 has a structure such as shown in FIGS. 16A and 16B. That is, a rotation axis RC inclined at an angle of 45° from the vertical direction on the movement axis HC side of a mount 21 is provided a first arm 311 fixed on the mount 21 at the other end, and a second arm 312 on which a detector 31 is supported is rotatable about the rotation axis RC.

As shown in FIG. 16A, a lever 31a of the detector 31 supported in a horizontal attitude is bent through an angle of 90° from the main body of the detector and a runout of an outer peripheral portion of a workpiece W is detected by means of a probe P at the tip. The second arm 312 is turned through an angle of 180° to enable detection of a runout of the upper surface of a flange of the workpiece W as shown in FIG. 16B. In this case, there is no need to rotate the detector 31 about the axis KC.

SUMMARY OF THE INVENTION

In the detector supporting mechanisms disclosed in Japanese Patent Application Laid Open Nos. 11-063971 and 07-091949, however, turning of the arm on which the detector 31 is mounted and rotation of the detector 31 through an angle of 90° about the axis of the detector 31 are required for changing the detection direction of the detector 31 from the horizontal direction to the vertical direction. The detection direction cannot be changed in one motion. The operation for changing the detection direction is complicated.

In the case of the detector supporting mechanism disclosed in Japanese Patent Application Laid Open No. 11-063971, the position of the probe when the detector 31 is in the vertical attitude is higher than the lower end of the supporting arm 111. Therefore there is a problem that an outer peripheral portion of a large-diameter workpiece interferes with the lower end of the supporting arm 111 at the time of measurement of a bore at a center of the workpiece.

The detector supporting mechanism disclosed in Japanese Patent Application Laid Open No. 06-300505 is capable of changing the detection direction from the horizontal direction to the vertical direction in one motion, but has a problem in the case of measurement of a bore at a center of a large-diameter workpiece because of its restricted bosom, as does the detector supporting mechanism disclosed in Japanese Patent Application Laid Open No. 11-063971. It also has a problem that when the detection direction is vertical, the lever 31a of the detector 31 cannot be projected in a direction perpendicular to the movement axis HC of the mount 21, and the adaptable width is restricted with respect to various objects to be measured.

In the case of the detector supporting mechanisms disclosed in Japanese Patent Application Laid Open Nos. 11-063971 and 06-300505, the position of the probe can be lowered relative to the mount if the position at which the detector 31 is mounted is lowered or if a detector 31 having a lever extended in the axial direction is used. However, if the position of the probe is changed in this way, a large shift occurs between the position of the probe before the attitude of the detector 31 is changed and the position of the probe after the attitude of the detector 31 is changed, and a need arises to largely move the detector supporting mechanism in the horizontal and vertical directions.

In view of the above-described circumstances, an object of the present invention is to provide a detector supporting mechanism capable of changing the detection direction of a detector in one motion with respect to various workpieces and easily making measurements on outer and inner peripheral surfaces and a flat surface of a cylinder.

To achieve the above-described object, according to the present invention, there is provided a detector supporting mechanism including a first arm having its one end fixed on a mount linearly movable relative to a workpiece, the first arm having a rotation axis at the other end, and a second arm provided on the first arm so as to be turnable on the rotation axis relative to the first arm, a detector being mounted on a tip of the second arm, wherein the rotation axis is provided on a plane inclined at an angle of 45° from the movement axis of the mount while being inclined at an angle of 45° from the movement axis of the mount in a projection on a plane which is inclined at an angle of 45° from the plane inclined at an angle of 45° from the movement axis of the mount, and which contains the movement axis of the mount, and wherein an axis of the detector mounted on the second arm intersects the rotation axis.

In the above-described detector supporting mechanism, the detection direction of the detector is changed from one direction to another direction perpendicular to the one direction by turning the second arm through an angle of 120°.

According to the present invention, the second arm on which the detector is held supported so as to rotatable about the rotation axis provided on a plane inclined at an angle of 45° from the movement axis of the mount while being inclined at an angle of 45° from the movement axis of the mount in a projection on a plane which is inclined at an angle of 45° from the plane inclined at an angle of 45° from the movement axis of the mount, and which contains the movement axis of the mount. Also, the axis of the detector mounted on the second arm intersects the rotation axis. The detection direction of the detector can be changed through an angle of 90° by only turning the second arm through an angle of 120°. Therefore, the detector supporting mechanism can change the detection direction of the detector from a horizontal direction to a vertical direction in one motion.

In the above-described detector supporting mechanism, the detector may be mounted so that the point of detection by the detector is at a certain distance from the movement axis of the mount.

According to the present invention, since the point of detection by the detector is at a certain distance from the movement axis of the mount, interference between a large-diameter workpiece and the mount can be avoided even in the case of measurement on an inner peripheral portion of a bore in the large-diameter workpiece.

In the above-described detector supporting mechanism, if the detector is mounted so that the point of detection by the detector coincides with a point on the rotation axis, the detection point is not moved even when the detection direction is changed to the perpendicular direction by turning the second arm through an angle of 120°.

According to the present invention, since the detection point is not moved even when the detection direction of the detector is changed, there is no need to largely adjust the detector supporting mechanism after changing the detection direction.

The above-described detector supporting mechanism may further include a drive device which drives and turns the second arm about the rotation axis to automatically change the detection direction of the detector.

According to the present invention, the second arm is automatically turned by the drive device to automatically change the detection direction of the detector, thus automatizing measuring operations.

As described above, the detector supporting mechanism of the present invention is capable of easily changing the detection direction of the detector from a horizontal direction to a vertical direction in one motion.

DETAILED DESCRIPTION OF THE PREFERRED EMBODIMENTS

Figure 1:
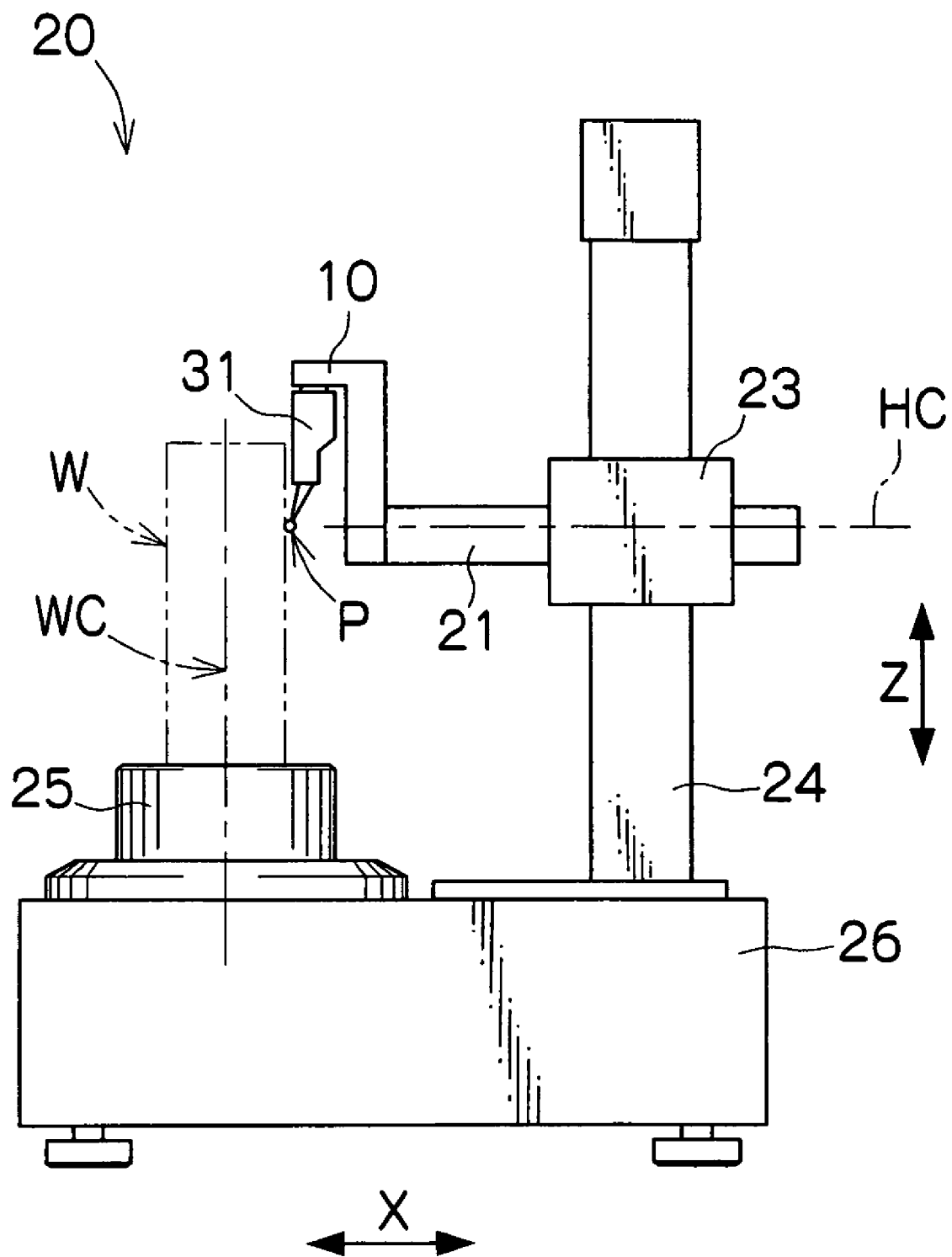
FIG. 1 is a front view of an appearance of a circularity measuring apparatus.

A preferred embodiment of a detector supporting mechanism in accordance with the present invention will be described in detail with reference to the accompanying drawings. In the drawings, members identical to each other are indicated by the same numerals or characters.

The detector supporting mechanism in accordance with the present invention can be suitably used, for example, in a circularity measuring apparatus for measuring attributes of a cylindrical workpiece including the circularity and the cylindricity. The circularity measuring apparatus will first be outlined.

FIG. 1 is a front view of an appearance of the circularity measuring apparatus. The circularity measuring apparatus 20 has a base 26, a turntable 25 on which a workpiece W is placed and which rotates about a rotational centerline WC with accuracy, a column 24 standing upright on the base 26, a vertically movable support 23 vertically movable along the column 24 in the Z-direction shown in the figure, a mount 21 which is attached to the vertically movable support 23 and which is horizontally movable in the X-direction shown in the figure along a movement axis HC extending toward the rotational centerline WC, and a control unit (not shown).

A detector 31 is mounted on the mount 21 by means of a detector supporting mechanism 10. A detector such as a lever-type detector incorporating a differential transformer is used as the detector 31. A detector using a digital scale, an optical-interference-type detector or the like may alternatively be used as the detector 31.

When the circularity of cylindrical the workpiece W is measured, the workpiece W is first placed on the turntable 25, as shown in FIG. 1. At this time, the placed position is adjusted so that the axis of the workpiece W coincides substantially with the rotational centerline WC.

This adjustment of the placed position is performed as described below. The mount 21 on which the detector 31 is held by means of the detector supporting mechanism 10 is moved in the direction toward the workpiece W along the movement axis HC to bring the probe P of the detector 31 into contact with an outer peripheral surface of the workpiece W. A runout of the workpiece W is observed at a low magnification while the turntable 25 is being rotated. The placed position is adjusted so that the runout is reduced. In this case, even if the axis of the workpiece W and the rotational centerline WC do not completely coincide with each other, obtained data can be corrected by using a piece of eccentricity correction software at the stage of analysis of the measured value.

Thereafter, the measurement magnification is changed to a high magnification and data corresponding to one revolution of the workpiece W is taken in. This data is analyzed in the control unit and the circularity of the outer peripheral portion of the workpiece W is computed. The result of computation is displayed on a display provided in the control unit. If necessary, the result of computation is recorded by means of a printer or the like connected to the control unit.

Figure 12:
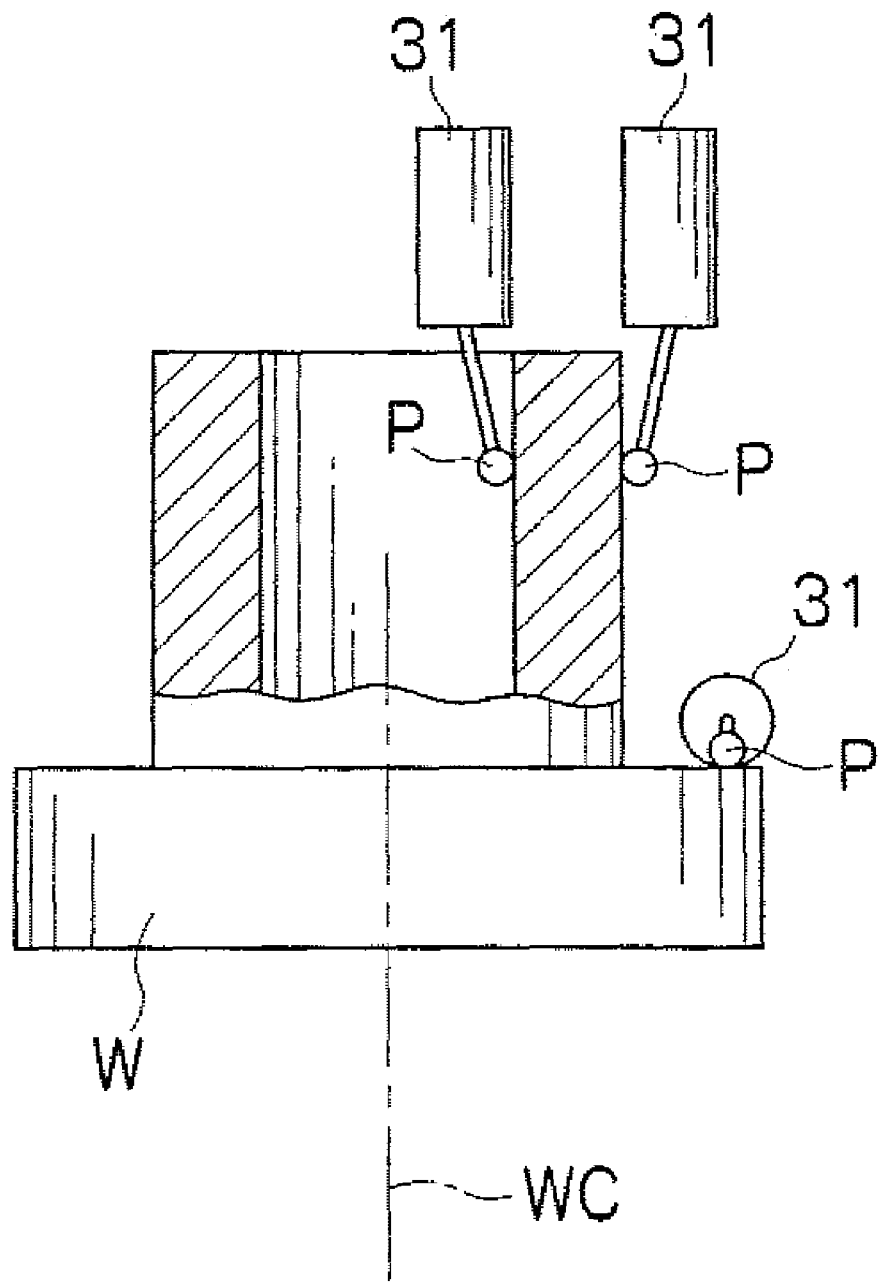
FIG. 12 is a schematic diagram for explaining measurements on a cylindrical workpiece.
Figure 13:
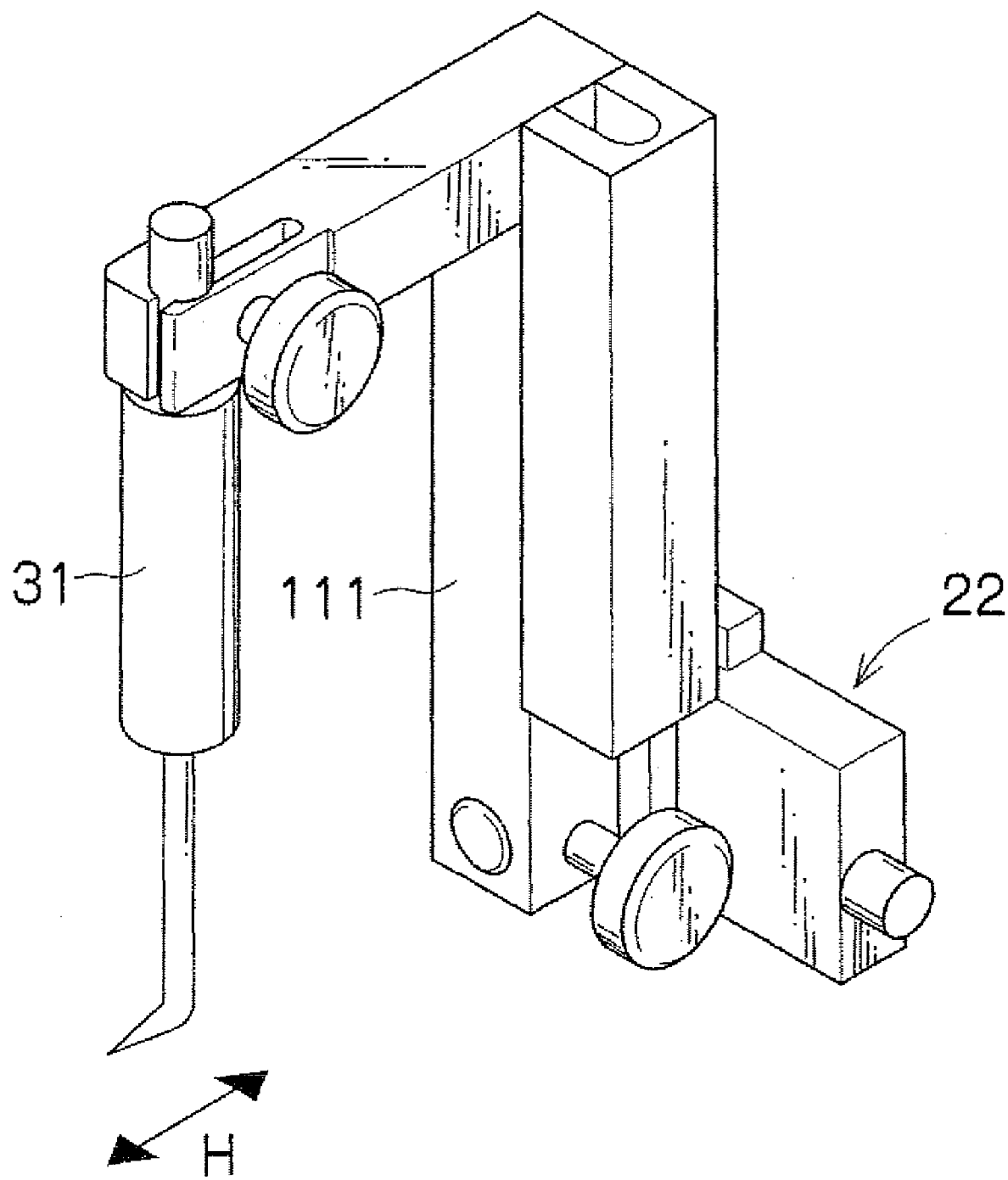
FIG. 13 is a perspective view 1 of a first example of the conventional art.
Figure 14:
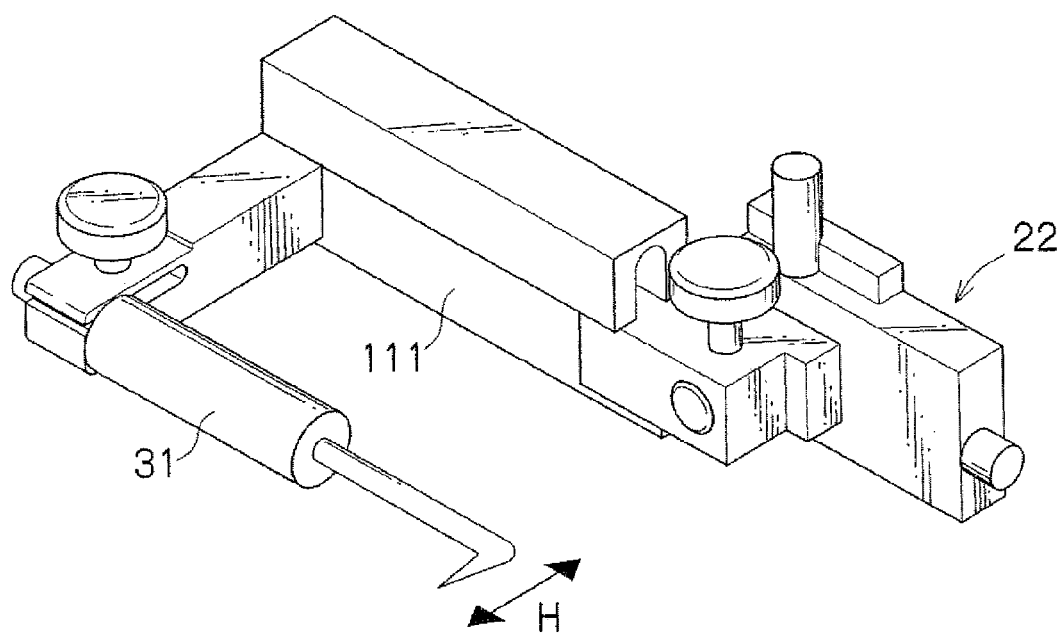
FIG. 14 is a perspective view 2 of the first example of the conventional art.
Figure 15:
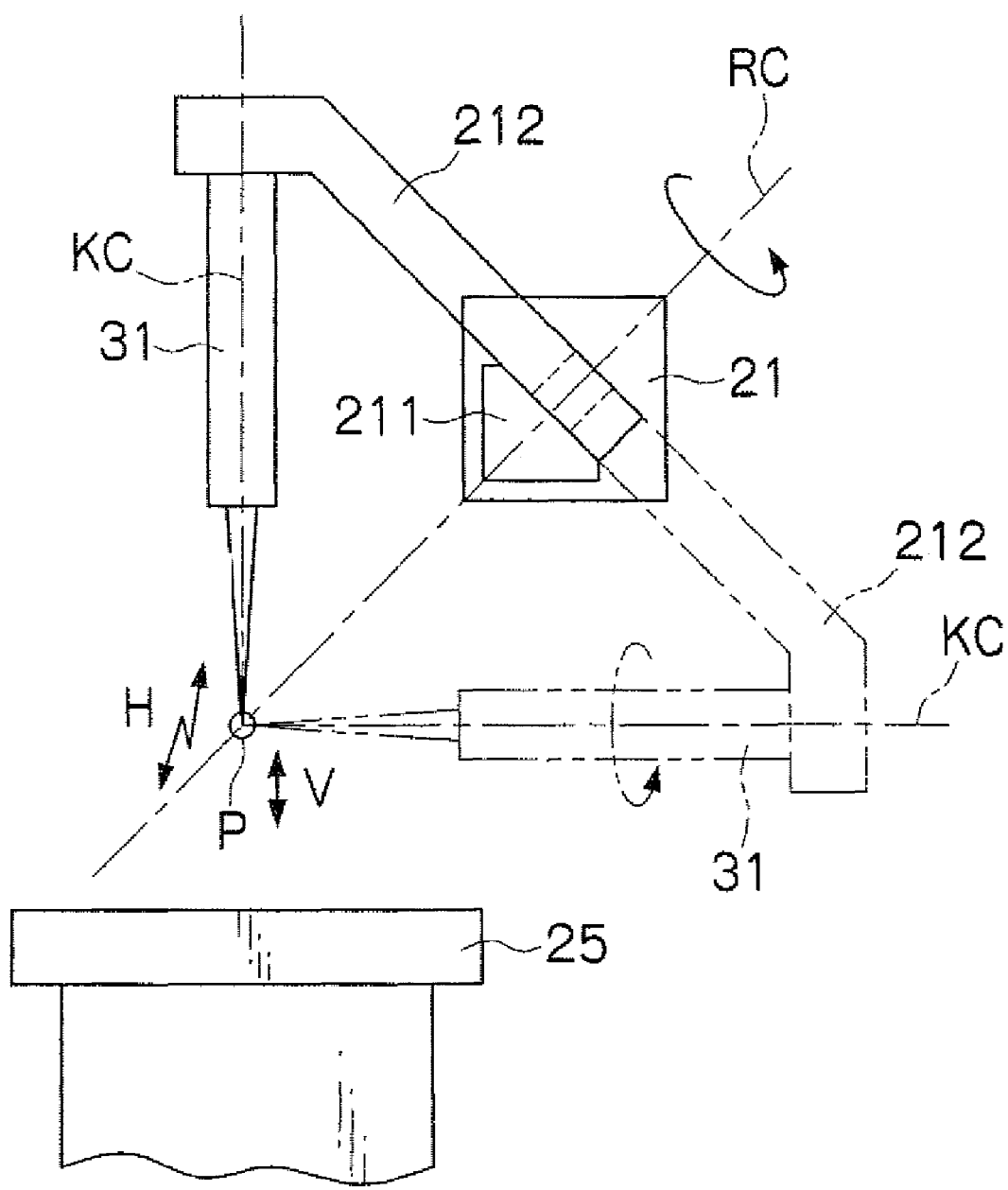
FIG. 15 is a left side view of a second example of the conventional art.
Figure 16A:
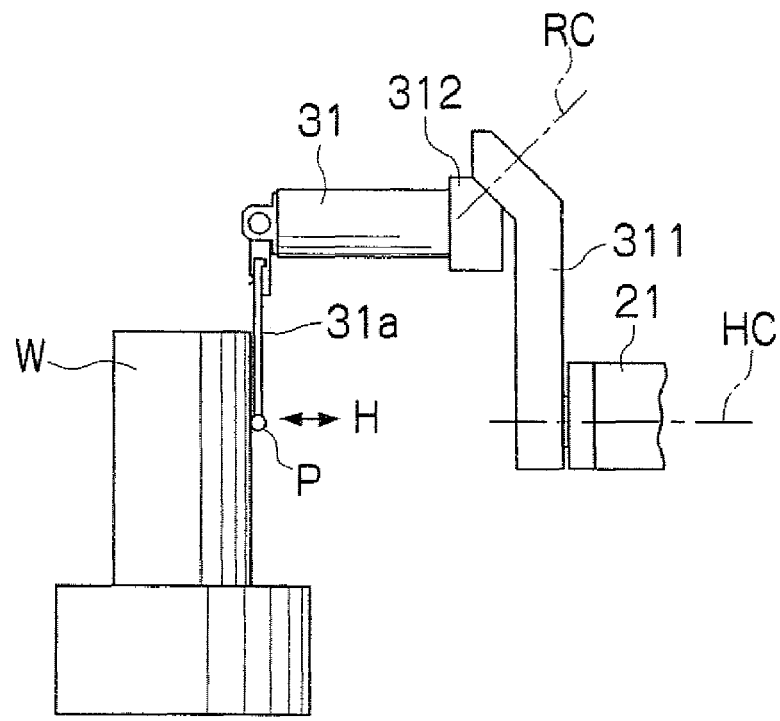
FIG. 16A is a front view 1 of a third example of the conventional art.
Figure 16B:
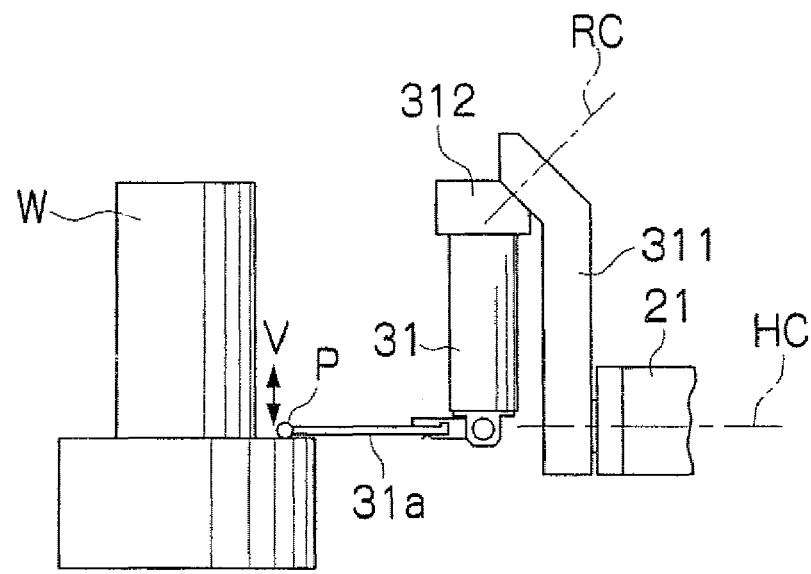
FIG. 16B is a front view 2 of a third example of the conventional art.

If the workpiece W has a flange such as that described above with reference to FIG. 12, a runout of the surface of the flange is measured. In this case, the detection direction is changed to the vertical direction by changing the attitude of the detector 31. The detector supporting mechanism 10 is operated to change the attitude of the detector 31.

Figure 2:
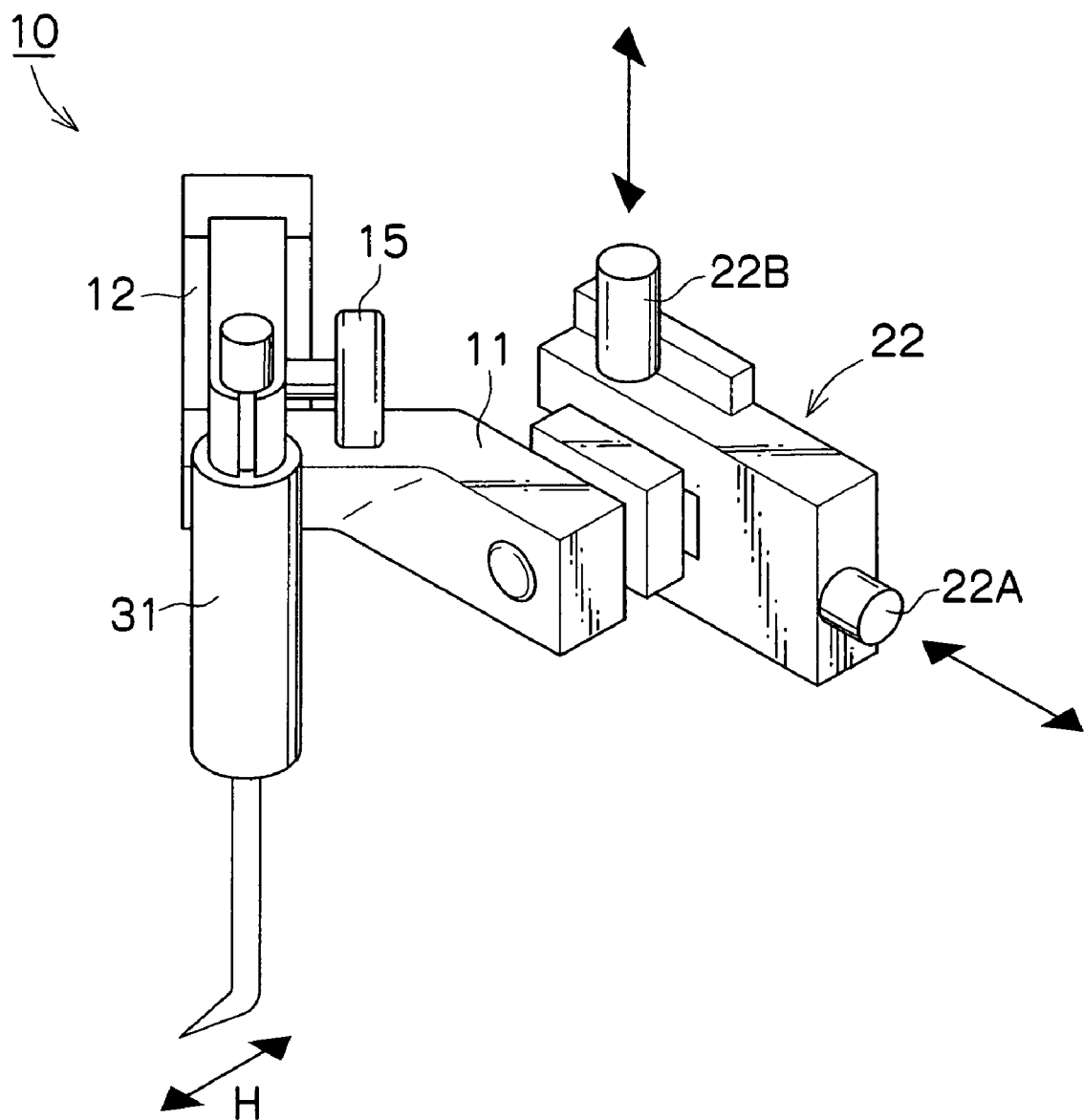
FIG. 2 is a perspective view 1 of an embodiment of a detector supporting mechanism in accordance with the present invention.
Figure 3:
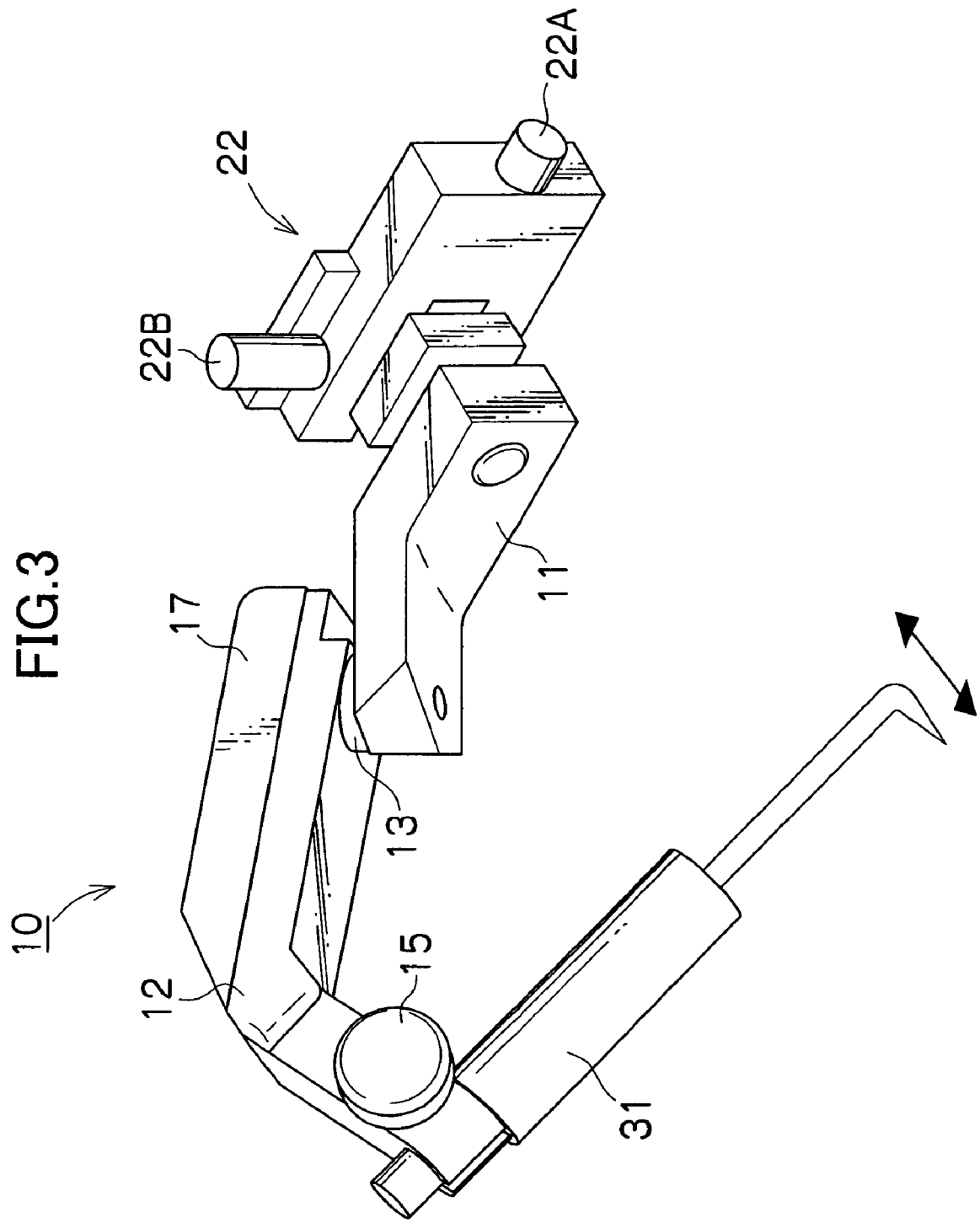
FIG. 3 is a perspective view 2 of the embodiment of the detector supporting mechanism in accordance with the present invention.
Figure 4:
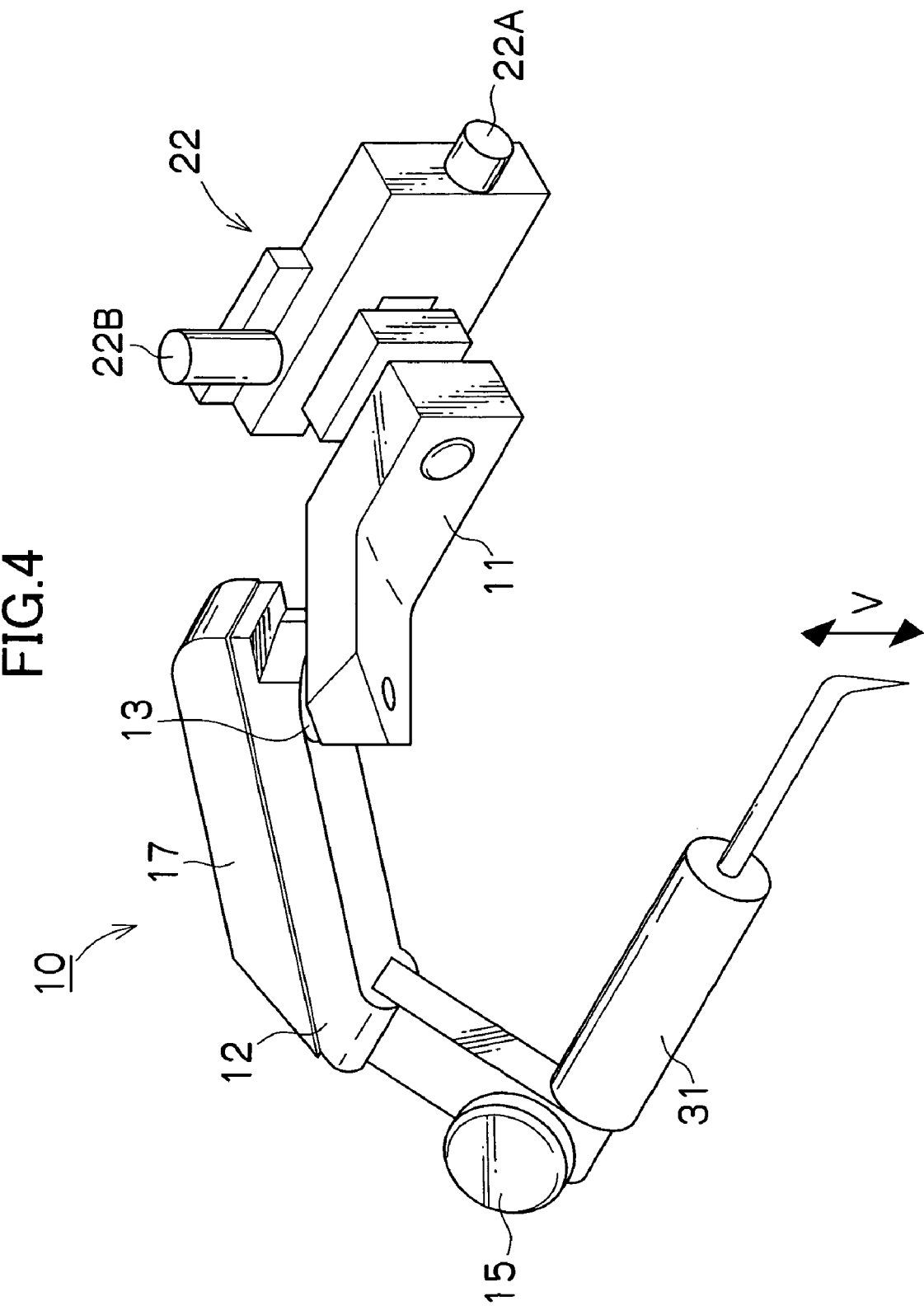
FIG. 4 is a perspective view 3 of the embodiment of the detector supporting mechanism in accordance with the present invention.

FIGS. 2, 3, and 4 are perspective views of an embodiment of the detector supporting mechanism 10 in accordance with the present invention. FIG. 2 shows a state in which the detector 31 is supported in a vertical attitude, and FIG. 4 shows a state in which the detector 31 is supported in a horizontal attitude. FIG. 3 shows a state in which the detector 31 is supported in an intermediate attitude between the vertical and horizontal attitudes.

Figure 5:
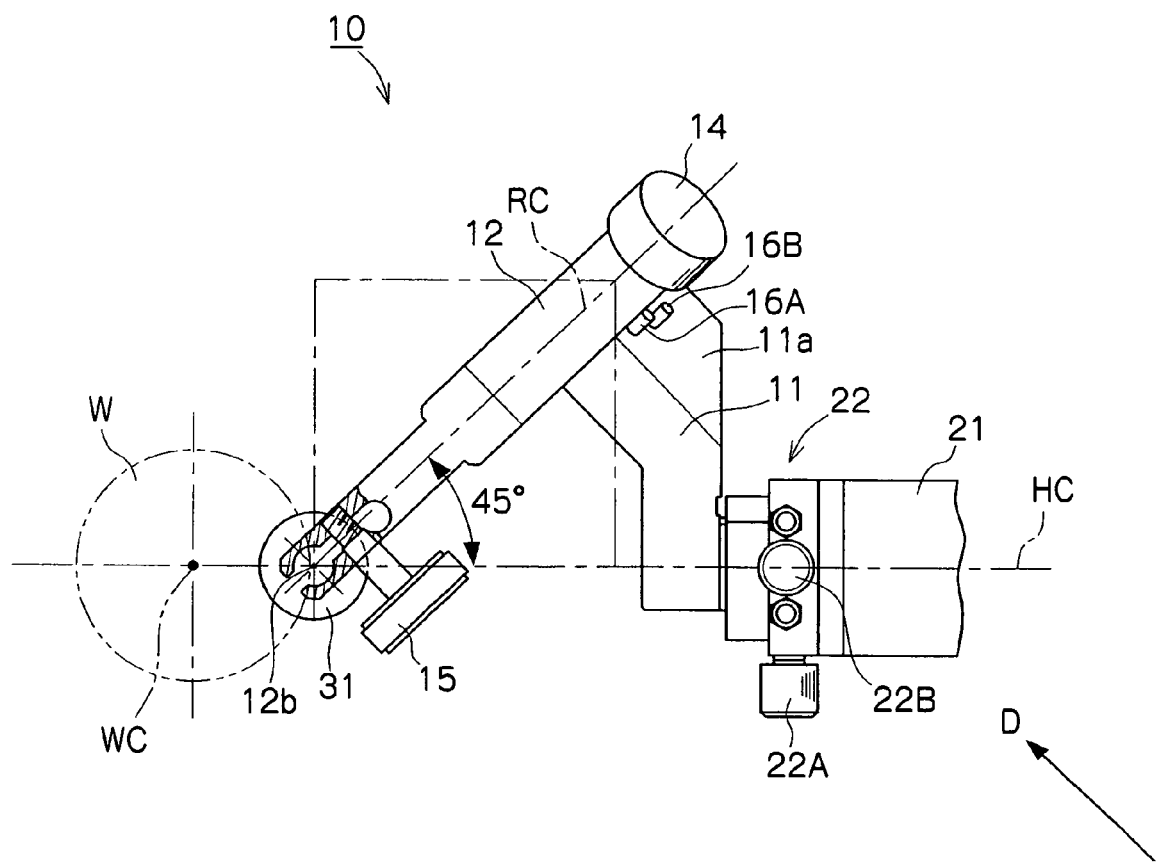
FIG. 5 is a plan view of the embodiment of the detector supporting mechanism in accordance with the present invention.
Figure 6:
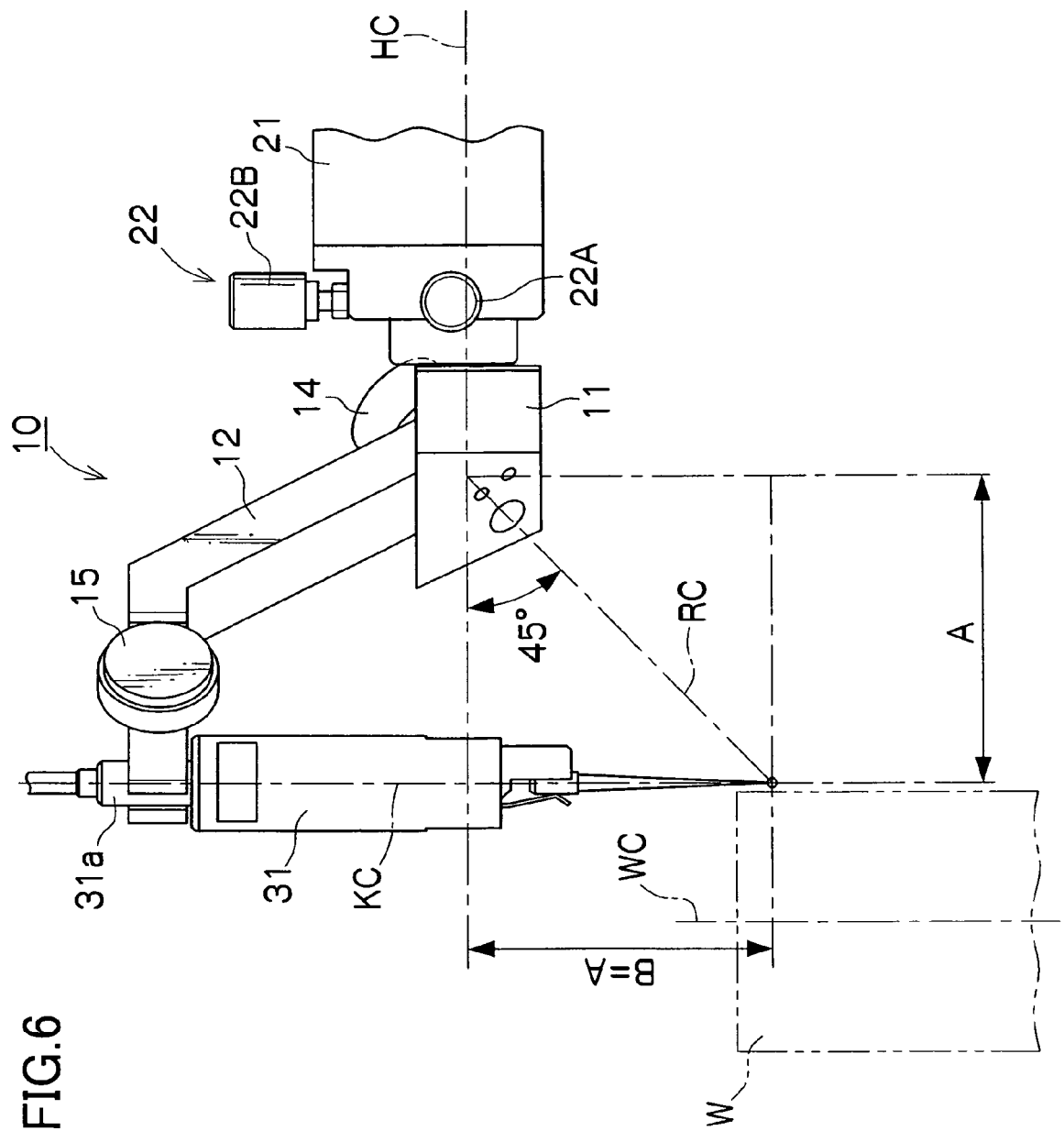
FIG. 6 is a front view of the embodiment of the detector supporting mechanism in accordance with the present invention.
Figure 7:
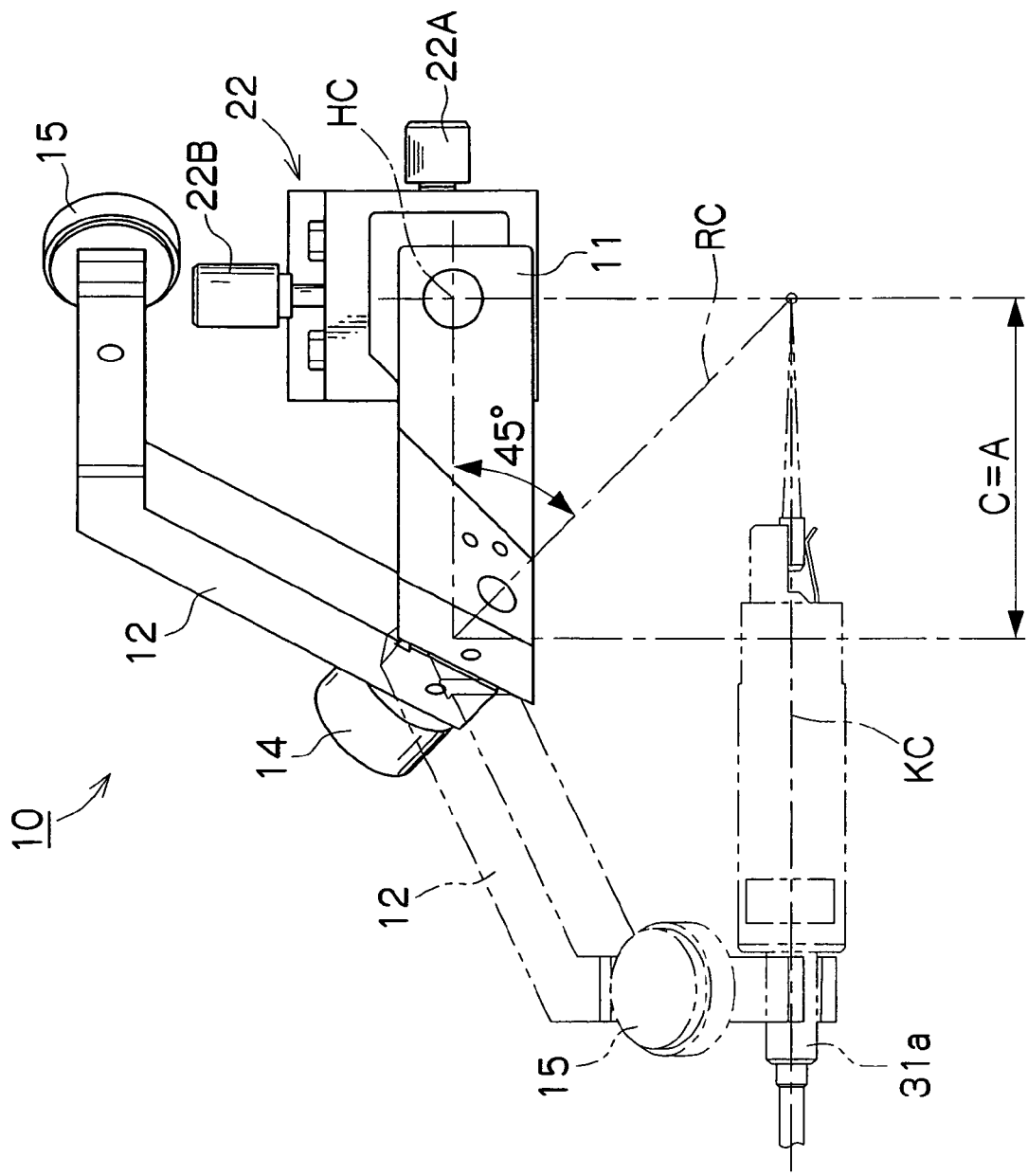
FIG. 7 is a left side view of the embodiment of the detector supporting mechanism in accordance with the present invention.
Figure 8:
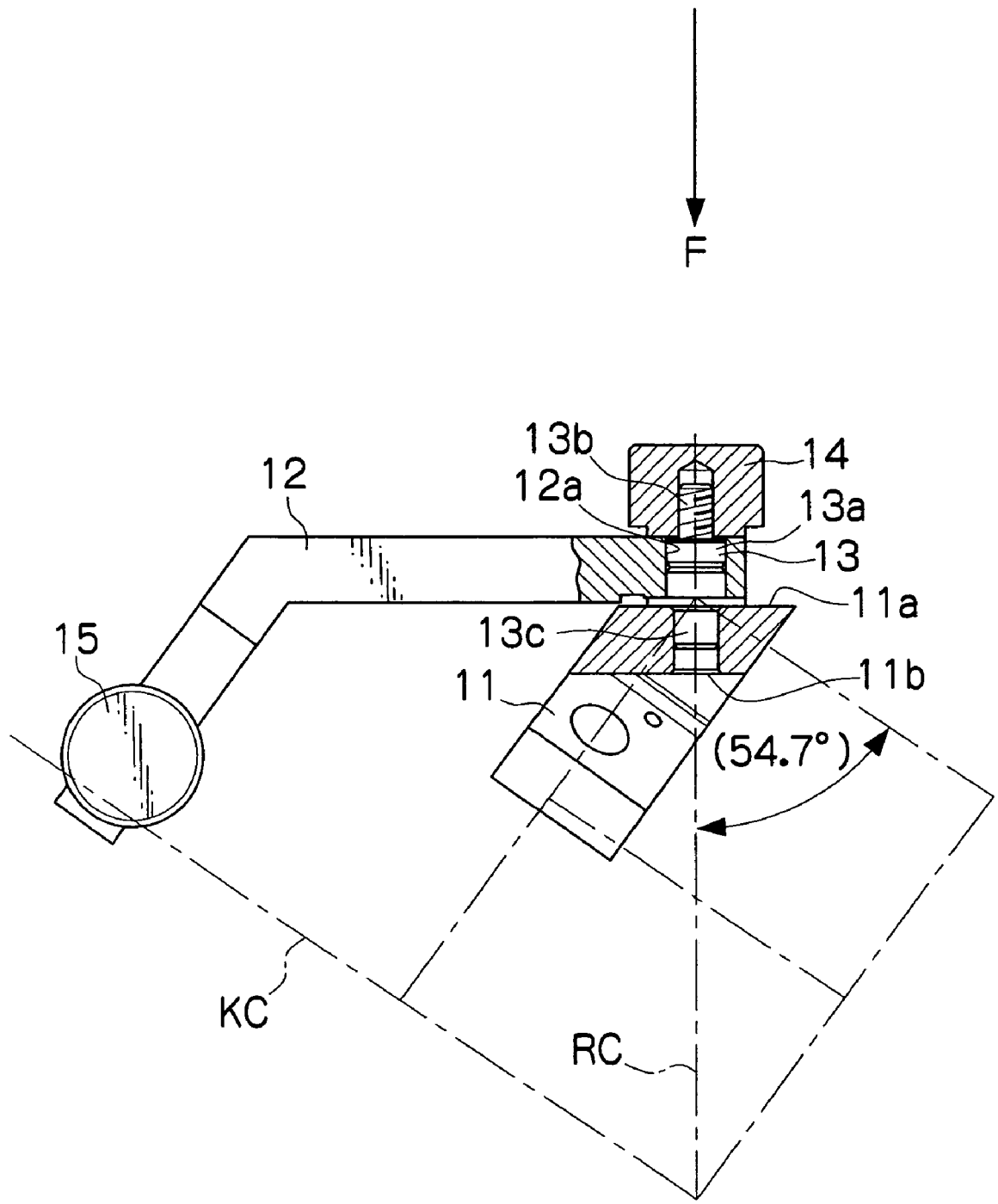
FIG. 8 is a view taken along arrow D in FIG. 5.
Figure 9:
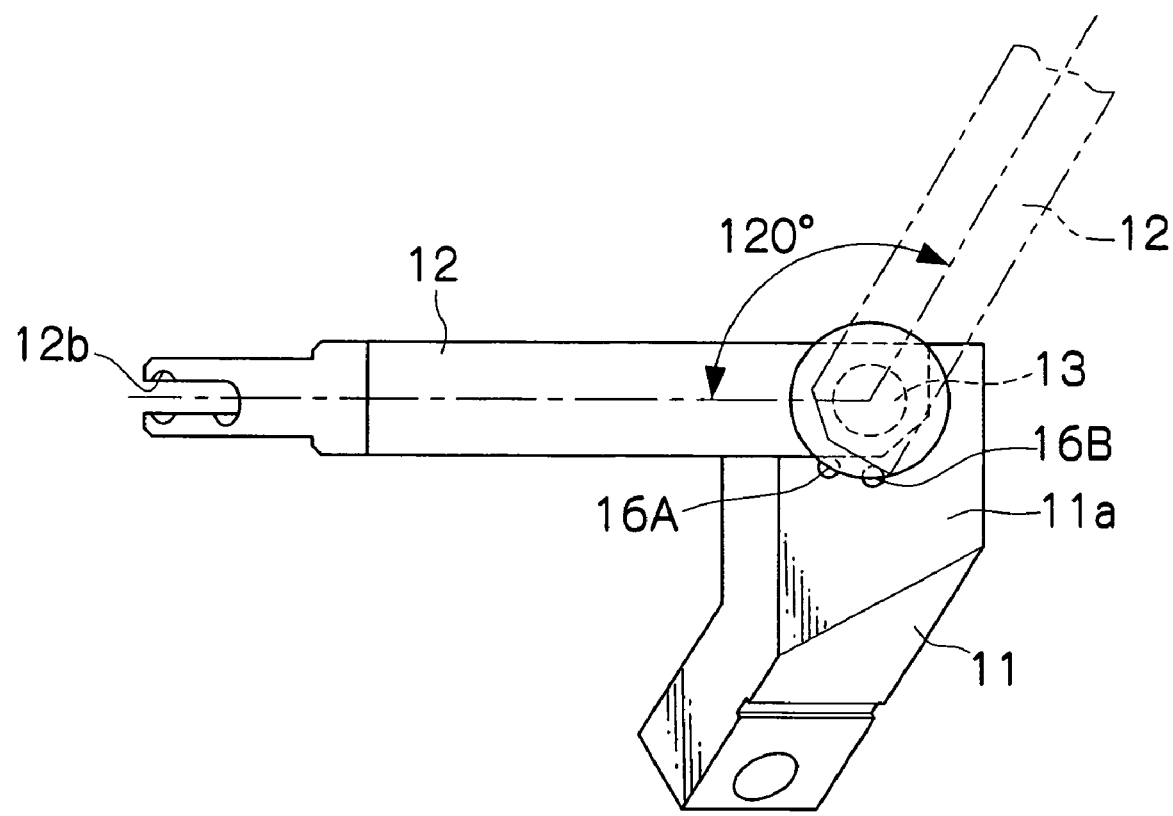
FIG. 9 is a view taken along arrow F in FIG. 8.

FIG. 5 is a plan view of the detector supporting mechanism 10 in the state shown in FIG. 2, FIG. 6 is a front view, and FIG. 7 is a left side view. FIG. 8 is a view taken along arrow D in FIG. 5, and FIG. 9 is a view taken along arrow F in FIG. 8.

The detector supporting mechanism 10 is constituted by a first arm 11, a second arm 12 and a rotary shaft member 13. As shown typically in FIGS. 2 to 5, the first arm 11 has a shape bent through an angle of 45° at an intermediate position in the longitudinal direction while being twisted through an angle of 45° from a vertical plane, and one end of the first arm 11 is fixed on the mount 21 by means of a horizontal/vertical fine adjustment mechanism 22.

The mount 21 is a part of the measuring apparatus provided linearly movably along the movement axis HC extending toward the rotational centerline WC of the workpiece W, as shown in FIG. 5. In the horizontal/vertical fine adjustment mechanism 22, a horizontal fine movement is caused by rotating a knob 22A and a vertical fine movement is caused by rotating a knob 22B.

In an outer surface 11a of the first arm 11 at the other end, i.e., the end of the portion bent through an angle of 45° in the longitudinal direction and twisted through an angle of 45° from a vertical plane, a hole 11b is formed in a direction perpendicular to the outer surface 11a.

The rotating shaft member 13 is forcibly fitted in the hole 11b in the outer surface 11a. As shown in FIG. 8, a male screw 13b is formed on the rotary shaft member 13, a rotation guide portion 13a is formed as an intermediate portion, and a forcible-fitting portion 13c is formed below the rotation guide portion 13a with a flange provided therebetween. In a state where the forcible-fitting portion 13c of the rotary shaft member 13 is forcibly fitted in the hole 11b, the axis of the rotary shaft member 13 forms the rotational axis RC.

As shown typically in FIGS. 3 and 8, the second arm 12 has a shape bent through an obtuse angle in the longitudinal direction, has a hole 12a formed on the base end side, and is slidably fitted in the rotation guide portion 13a of the rotary shaft member 13 so as to be rotatable relative to the first arm 11. A knob 14 is screwed around the male screw 13b of the rotary shaft member 13 to enable adjustment of a torque between the second arm 12 and the rotary shaft member 13. Also, the knob 14 may be fastened to clamp the second arm 12. A cover 17 is attached to the second arm 12, as shown in FIGS. 3 and 4.

As shown in FIG. 5, a hole 12b and a slitting formed continuously with the hole 12b are formed in the second arm 12 at the other end. An inner portion of the slitting is increased only on one side and the thickness of the portion forming the slitting on this side is reduced to obtain a spring effect. A threaded hole is formed transversely to this slitting. A knob 15 is screwed into this threaded hole to clamp a hold portion 31a of the detector 31 in the hole 12b.

In the detector supporting mechanism 10 constructed as described above, the axis of rotation RC of the second arm 12 relative to the first arm 11 is provided on a plane inclined at an angle of 45° from the movement axis HC of the mount 21 while being inclined at an angle of 45° from the movement axis HC of the mount 21 in a projection on a plane which is inclined at an angle of 45° from the plane inclined at an angle of 45° from the movement axis HC of the mount 21, and which contains the movement axis HC of the mount 21, as shown in FIGS. 5, 6 and 7.

In other words, the rotation axis RC is inclined at an angle of 45° from the rotational centerline WC of the workpiece W and is inclined at an angle of 45° from the movement axis HC of the mount 21 in a projection on a plane perpendicular to the rotational center line WC. Accordingly, the rotation axis RC is inclined at an angle of 45° from the movement axis HC, as viewed in FIG. 6, and is inclined at an angle of 45° from a plane containing the movement axis HC, as viewed in FIG. 7.

When the detector 31 is attached to the second arm 12, the axis KC of the detector 31 and the rotation axis RC of the second arm 12 intersect each other. Accordingly, referring to FIG. 6, the distance A between the axis KC of the detector 31 and the point of intersection of the rotation axis RC and the movement axis HC is equal to the distance B between the movement axis HC and the point of intersection of the axis KC of the detector 31 and the rotation axis RC. Also, referring to FIG. 7, the distance C between the movement axis HC and point of intersection of the rotation axis RC and the plane containing the movement axis HC is equal to the distance A.

The detector supporting mechanism 10 is thus constructed. When the second arm 12 is turned through an angle of 120° relative to the first arm 11, the detector 31 attached in the vertical attitude to the second arm 12 is changed into the horizontal attitude, as shown in FIGS. 3 and 7. Simultaneously, the detection direction is changed from a horizontal direction H to a vertical direction V. The second arm 12 can also be fixed in an intermediate position between 0° and 120°. In this case, the detection direction is also an intermediate direction between the horizontal direction H and the vertical direction V.

Positioning pins 16A and 16B are provided on the first arm 11, as shown in FIG. 9. Each of the positioning pins 16A and 16B contacts with a side surface of the second arm 12 to limit the angle through which the second arm 12 can turn to 120°.

If the detection point of the detector coincides with one point on the rotation axis RC of the second arm 12, the detection point is not moved even when the detection direction of the detector is changed by turning the second arm 12. Therefore, there is no need to largely move the detector in horizontal and vertical directions when the detection direction is changed, so that the measurement time can be reduced.

Since the detection point of the detector is positioned lower relative to the movement axis HC of the mount 21, a large-diameter workpiece W does not interfere with the detector supporting mechanism 10, the mount 21 or any other member during measurement on an inner surface of a bore formed in the large-diameter workpiece W.

Thus, the detector supporting mechanism 10 of the present invention is capable of changing the detection direction of the detector 31 in one motion, avoiding a shift of the detection point when the detection point is changed, and setting the detection point lower relative to the mount 21, and can be easily adapted for measurements on inner and outer peripheral surfaces and flat surfaces of various workpieces W.

Figure 10:
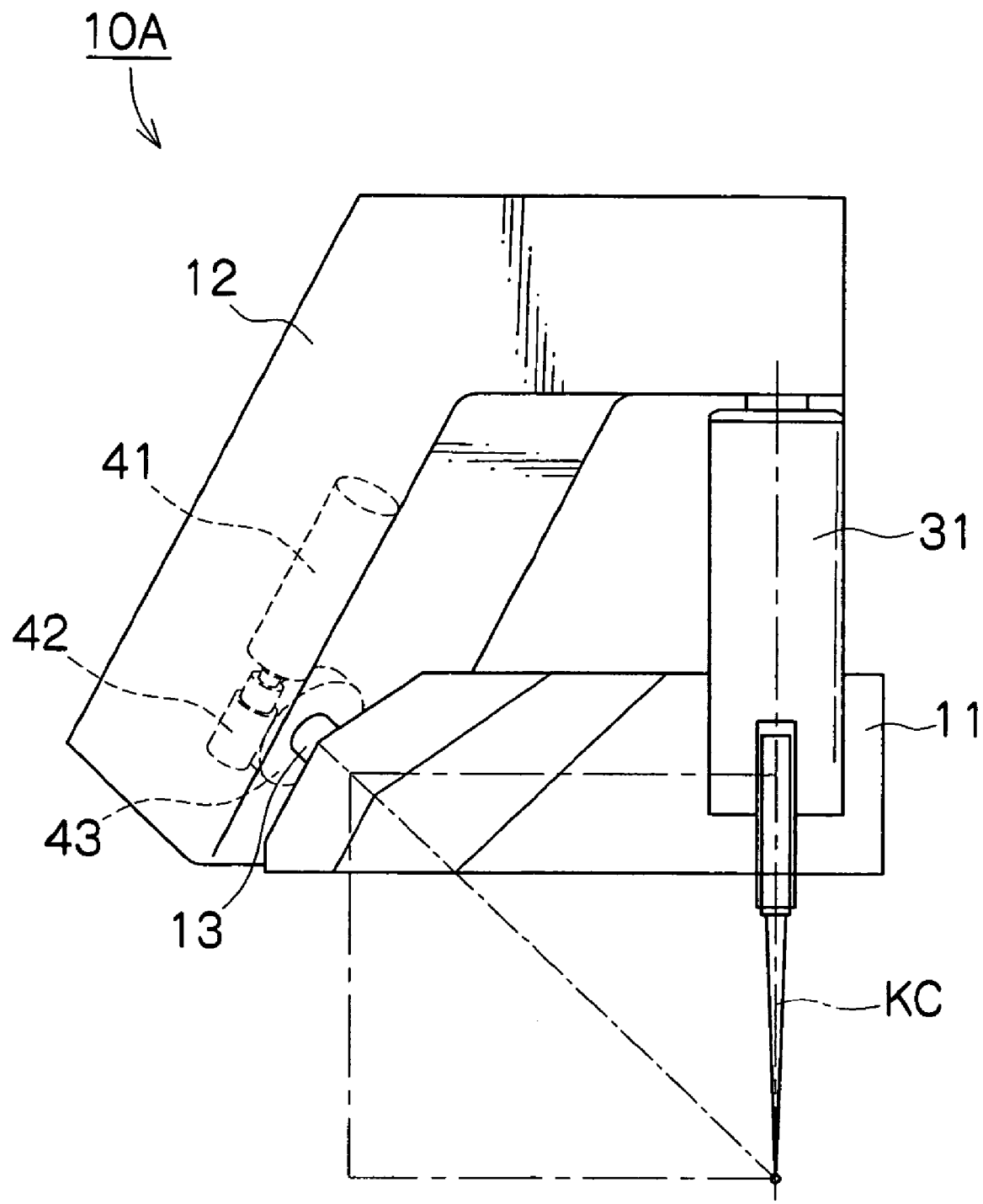
FIG. 10 is a left side view of a modification of the embodiment of the present invention.

An example of a modification of this embodiment will be described with reference to FIGS. 10 and 11. FIG. 10 is a left side view corresponding to FIG. 7 referred to in the above and FIG. 11 is a view taken along arrow F and corresponding to FIG. 9 referred to in the above.

Figure 11:
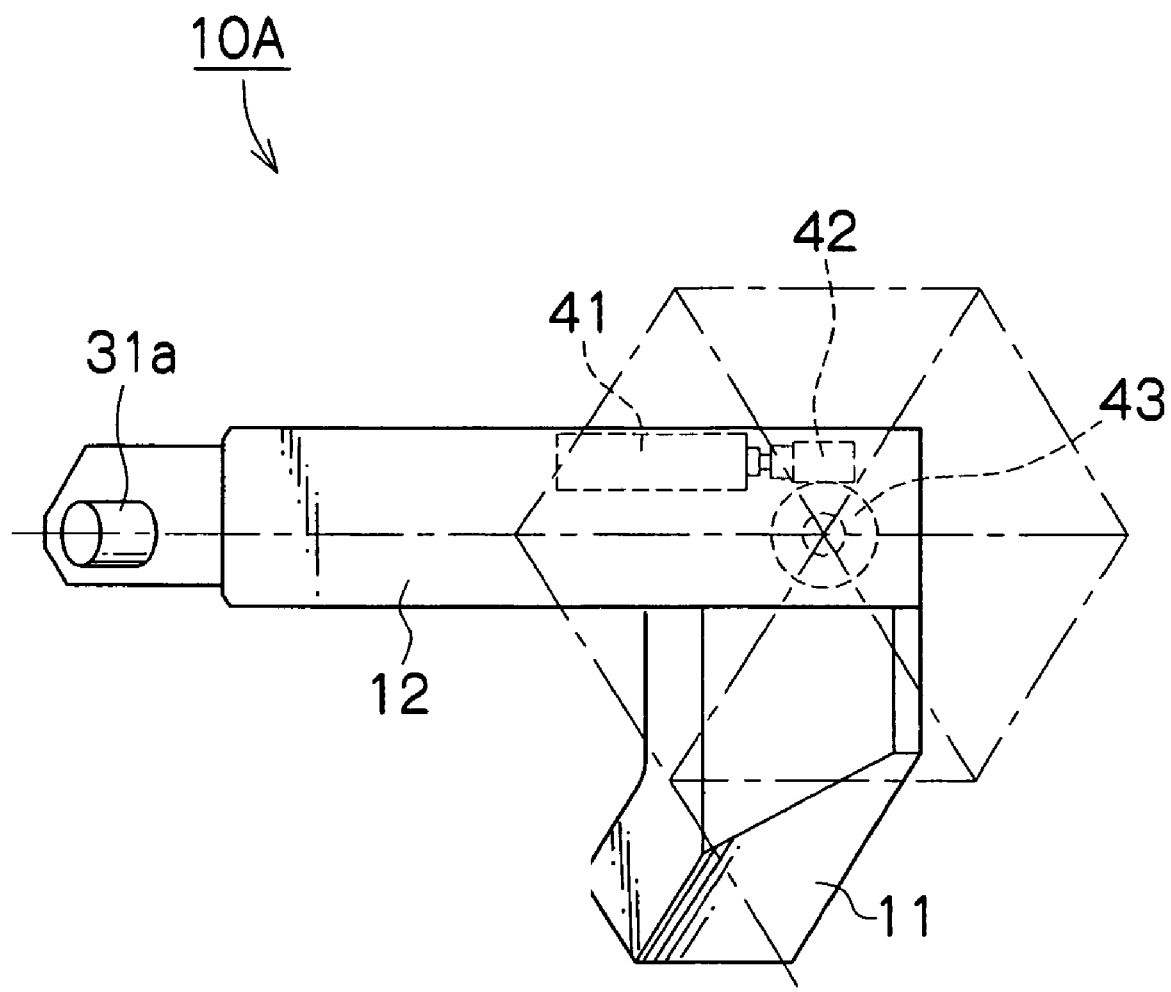
FIG. 11 is a view of the modification of the embodiment of the present invention taken along arrow F.

As shown in FIGS. 10 and 11, a detector supporting mechanism 10A is constructed so that the first arm 11 of the above-described detector supporting mechanism 10 can be automatically turned.

A worm wheel 43 is attached to the rotary shaft member 13 and is engaged with a worm 42 attached to a motor 41 provided as a drive device by being fixed on the second arm 12. The second arm 12 is turned on the worm wheel 43 by the rotation of the motor 41. The arrangement may also be such that the detector 31 is rotatably supported on the second arm 12 and is rotated about the axis KC of the detector 31 by a motor.

In other respects, the construction of the detector supporting mechanism 10A is the same as that of the detector supporting mechanism 10. Therefore no further description of the construction will be made.

The detector supporting mechanism 10A is thus arranged to enable the detection direction of the detector 31 to be automatically changed between horizontal and vertical directions. If the mechanism 10A is arranged so that the detector 31 is automatically rotated about the axis KC of the detector 31, the detection direction can be automatically changed to the opposite direction along one horizontal or vertical direction. Thus, measurements on inner and outer peripheral surfaces of a workpiece W and upper and lower surface of a flange can be automatically made speedily.

While the circularity measuring apparatus using the detector supporting mechanism of the present invention has been described as a table rotating-type circularity measuring apparatus 20 that the workpiece W is rotated about the rotation centerline WC in the description of the embodiment, the detector supporting mechanism 10 of the present invention can also be used suitably in a detector-rotating-type circularity measuring apparatus in which a workpiece W is fixed while the detector 31 is rotated about the rotational centerline WC, as well as in the table rotating-type circularity measuring apparatus 20. The detector supporting mechanism 10 can also be used effectively in various measuring apparatuses other than the circularity measuring apparatuses.

What is claimed is:

1. A detector supporting mechanism comprising:
    a first arm having its one end fixed on a mount linearly movable relative to a workpiece, the first arm having a rotation axis at the other end; and
    a second arm provided on the first arm so as to be turnable on the rotation axis relative to the first arm, a detector being mounted on a tip of the second arm,
    wherein the first arm comprises a first segment which extends in a radial direction with respect to the rotation axis thereof, and a second segment that has a mounting surface for the second arm that is bent through an angle of 45° in a longitudinal direction relative to an adjoining surface of said first segment about a vertical axis and is twisted through an angle of 45° from a vertical plane,
    wherein the second arm is mounted on the second segment of the first arm,
    wherein an axis of the detector mounted on the second arm intersects the rotation axis of the first arm,
    wherein the detector has a detection direction which is perpendicular to its axis, and
    wherein the detection direction of the detector is settable in a vertical direction, a horizontal direction or an intermediate direction between the vertical and horizontal directions by rotating the second arm around the rotation axis thereof and positioning the second arm at a predetermined position.

2. The detector supporting mechanism according to claim 1, wherein the detection direction of the detector is changed from one direction to another direction perpendicular by turning the second arm through an angle of 120°.

3. The detector supporting mechanism according to claim 2, wherein if the detector is mounted so that the point of detection by the detector coincides with a point on the rotation axis, the detection point is not moved even when the detection direction is changed to the perpendicular direction by turning the second arm through an angle of 120°.

4. The detector supporting mechanism according to claim 3, further comprising:
   a drive device Which drives and turns the second arm about the rotation axis to automatically change the detection direction of the detector.

5. The detector supporting mechanism according to claim 2, wherein the detector is mounted so that the point of detection by the detector is at a certain distance from the movement axis of the mount.

6. The detector supporting mechanism according to claim 2, further comprising:
   a drive device which drives and turns the second arm about the rotation axis to automatically change the detection direction of the detector.

7. The detector supporting mechanism according to claim 1, wherein the detector is mounted so that the point of detection by the detector is at a certain distance from the movement axis of the mount.

* * * * *